(12) United States Patent
Kim

(10) Patent No.: US 9,739,525 B2
(45) Date of Patent: Aug. 22, 2017

(54) CHAMBER SWITCH FOR REFRIGERATOR

(71) Applicant: Brian S. Kim, Rancho Palos Verdes, CA (US)

(72) Inventor: Brian S. Kim, Rancho Palos Verdes, CA (US)

(73) Assignee: KIM FAMILY TRUST, Rancho Palos Verdes, CA (US)

( * ) Notice: Subject to any disclaimer, the term of this patent is extended or adjusted under 35 U.S.C. 154(b) by 119 days.

(21) Appl. No.: 14/991,918

(22) Filed: Jan. 9, 2016

(65) Prior Publication Data

US 2017/0198964 A1 Jul. 13, 2017

(51) Int. Cl.
*F25D 27/00* (2006.01)
*F25D 29/00* (2006.01)

(52) U.S. Cl.
CPC ......... *F25D 27/005* (2013.01); *F25D 29/003* (2013.01)

(58) Field of Classification Search
CPC ............................. F25D 27/005; F25D 29/003
See application file for complete search history.

(56) References Cited

U.S. PATENT DOCUMENTS

| | | | | |
|---|---|---|---|---|
| 2,644,882 A | * | 7/1953 | Voda | F25D 27/00 362/155 |
| 5,873,646 A | * | 2/1999 | Fjaestad | F21V 7/005 362/125 |
| 7,320,528 B2 | * | 1/2008 | Gotz | A47B 97/00 362/155 |
| 8,777,434 B2 | * | 7/2014 | Van Beek | F25D 27/00 362/92 |

* cited by examiner

*Primary Examiner* — Emmanuel Duke
(74) *Attorney, Agent, or Firm* — John K. Park; Park Law Firm

(57) ABSTRACT

A door switch system is provided for energy saving in a refrigerator. The door switch system comprises a light detector, a first switch, and a second switch. The light detector is disposed in the storage space. The first switch is configured for switching the cooling fan according to an output from the light detector detecting external light. The second switch is configured for switching the storage-space light according to an output from the light detector detecting external light. When a door to the storage space is opened and the output is a first output indicating an open state of the door, the first switch is off to stop the cooling fan and the second switch is on to turn on the storage-space light. The light detector may detect the external light outside the storage space and provide the first or second output to the first and second switches.

12 Claims, 4 Drawing Sheets

– Prior Art –

CHAMBER SWITCH FOR REFRIGERATOR

BACKGROUND OF THE INVENTION

The present invention relates to a fan control device. More particularly, this invention relates to a fan control device for energy saving in a refrigerator.

A refrigerator cools down the temperature of a storage space. Since cooling is very energy-consuming process, it gets important to conserve as more energy as possible. Furthermore, with more pressure from regulation authorities, the demand for energy-saving or energy-efficient refrigerators gets higher and higher.

Conventionally, an evaporator fan and associated fan motor are provided in the refrigerator for circulating air in the storage space of the refrigerator and delivering more heat to the evaporator for cooling.

In order to save energy, the evaporator fan or the cooling fan is controlled to stop when the door to the chamber of the refrigerator is opened. In addition to this, the light in the chamber has been controlled to facilitate the usage of the refrigerator.

AS shown in FIG. 1, usually a refrigerator 900 has a door switch 910 according to prior arts, and as shown in FIG. 2, the refrigerator 900 may include other conventional components.

The door switch 910 was installed on an outer edge of a door frame so that a door is closed and presses on it so as to operate other related components of the refrigerator 900 to optimize operation of the refrigerator 900.

Since it is operated mechanically by the closing and opening door, the traditional door switch 910 may not be operated properly due to some change in the door or the door frame such as slacking of the door.

Accordingly, a need for a more efficient and convenient chamber switch has been present for a long time considering the tendency of growing in capacity of refrigerator. This invention is directed to solve these problems and satisfy the long-felt need.

SUMMARY OF THE INVENTION

The present invention contrives to solve the disadvantages of the prior art.

An object of the invention is to provide a chamber switch for a refrigerator.

Another object of the invention is to provide a chamber switch for energy saving.

Still another object of the invention is to provide a chamber switch, in which the operation of the chamber light and the cooling fan is controlled efficiently according to opening and closing of the door to the chamber.

An aspect of the invention provides a door switch system for energy saving in a refrigerator. The refrigerator includes a storage space that is cooled by refrigerant flowing through an evaporator, a storage-space light, a compressor, a condenser, and a cooling fan.

The door switch system comprises a light detector, a first switch, and a second switch.

The light detector is disposed in the storage space.

The first switch is configured for switching the cooling fan according to an output from the light detector detecting external light.

The second switch is configured for switching the storage-space light according to an output from the light detector detecting external light.

When a door to the storage space is opened and the output is a first output indicating an open state of the door, the first switch is off to stop the cooling fan and the second switch is on to turn on the storage-space light.

The light detector may be configured to detect the external light outside the storage space and provide the first output to the first and second switches.

The light detector may be installed inside the storage space.

The light detector may be installed at an inner portion of the storage space away from the door to the storage space.

Alternatively, the light detector may be installed close to the door to the storage space.

The light detector may be configured to provide a second output indicating a close state of the door when the door is closed.

The light detector may be configured to provide the second output in a specific time period after the first output was provided.

When the second output is provided, the first switch may be on to start the cooling fan and the second switch is off to turn off the storage-space light.

The door switch system may further comprise an external reference light provided outside the storage space to illuminate the light detector when the door is opened.

The external reference light may comprise a security light or a night light.

The external reference light may be installed to be directed to the light detector.

The first switch and the second switch may be integrated into one switch.

BRIEF DESCRIPTION OF THE DRAWINGS

These and other features, aspects and advantages of the present invention will become better understood with reference to the accompanying drawings, wherein.

DETAILED DESCRIPTION OF THE INVENTION

An object of the invention is to provide a chamber switch for a refrigerator.

Another object of the invention is to provide a chamber switch for energy saving.

Still another object of the invention is to provide a chamber switch, in which the operation of the chamber light and the cooling fan is controlled efficiently according to opening and closing of the door to the chamber.

Figure 3:
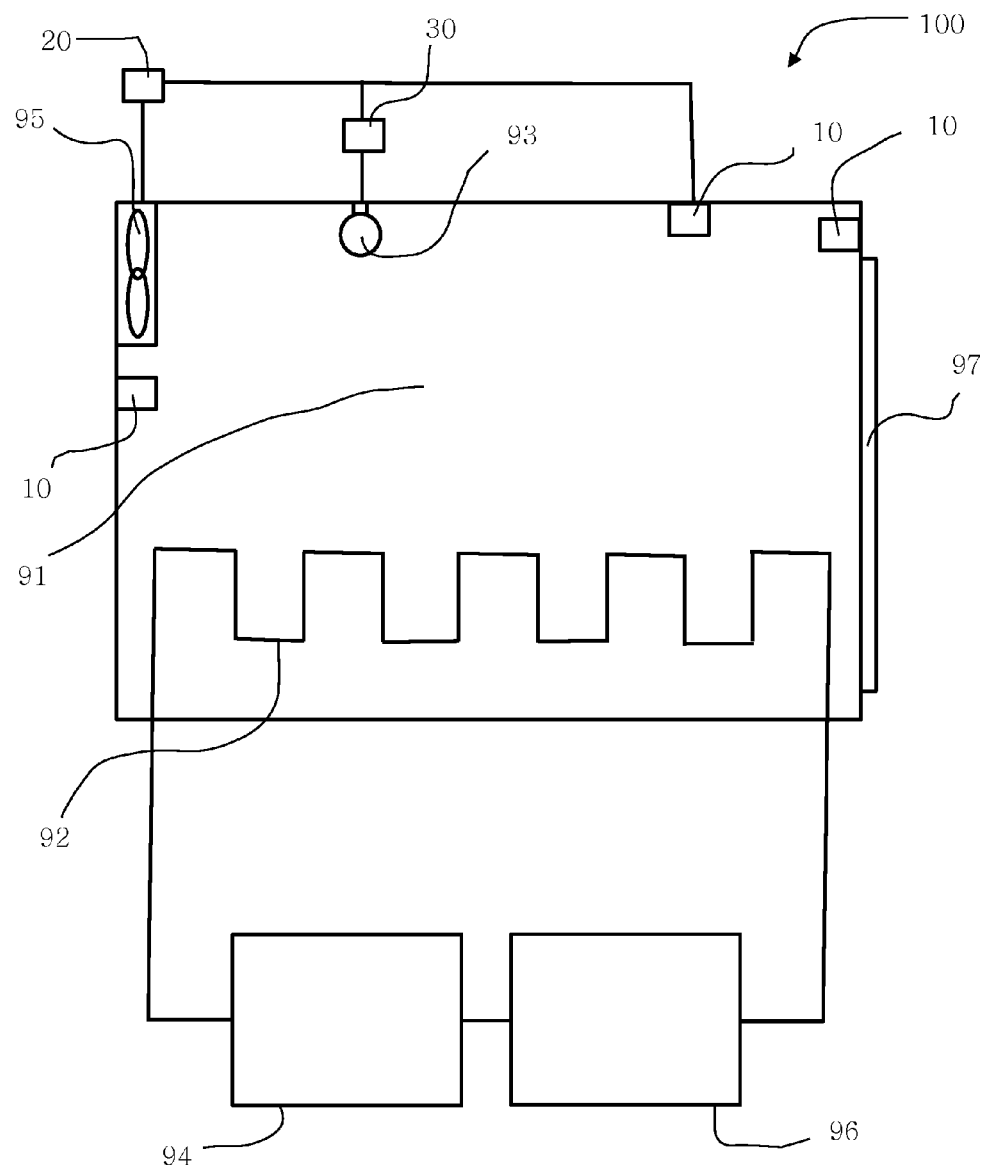
FIG. 3 is a schematic block diagram showing a refrigerator having a chamber switch according to an embodiment of the invention.
Figure 4:
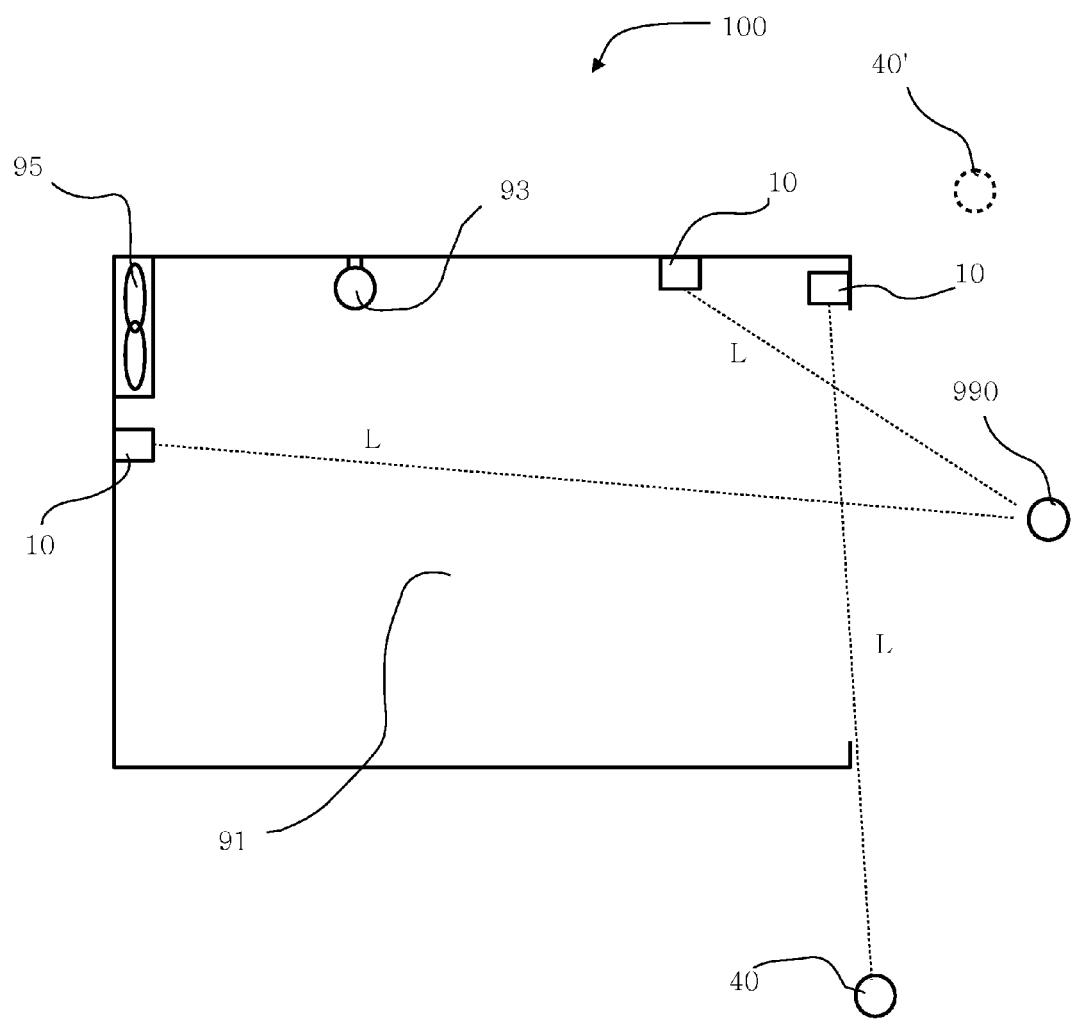
FIG. 4 is a cross-sectional schematic block diagram showing a refrigerator having a chamber switch according to an embodiment of the invention.

As shown in FIGS. 3 and 4, an aspect of the invention provides a refrigerator, comprising a chamber switch according to embodiments of the invention.

Figure 1:
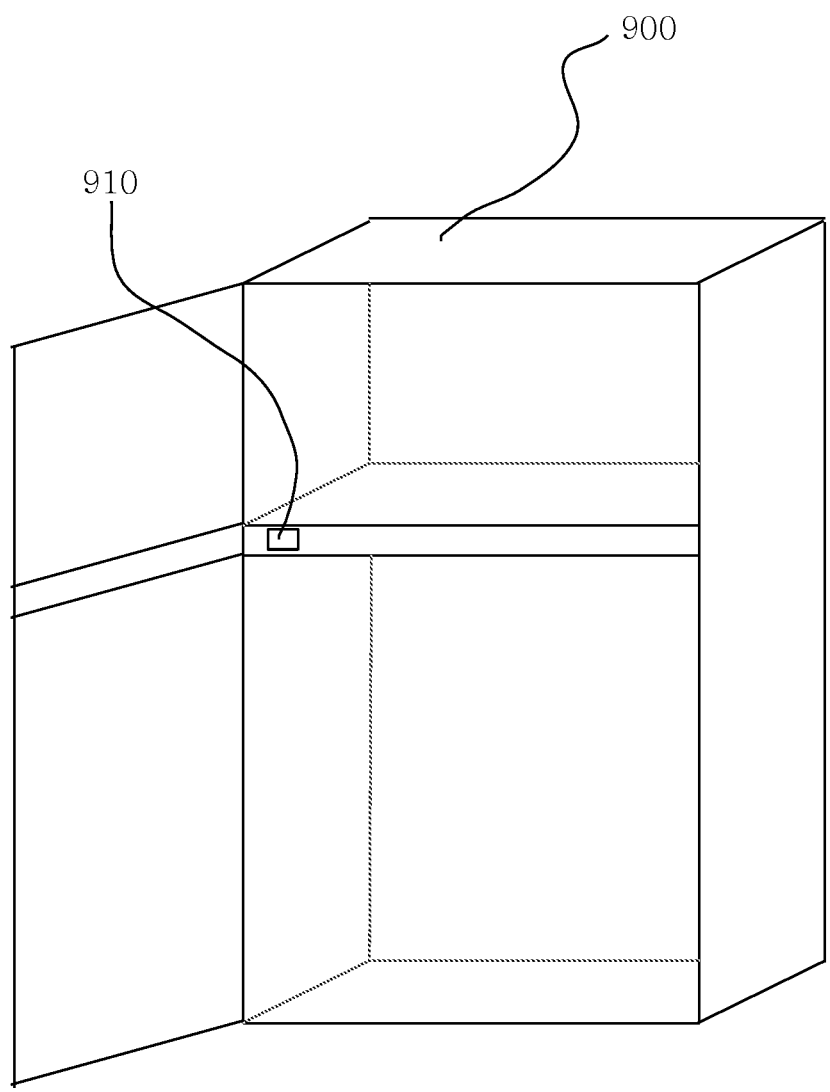
FIG. 1 is a perspective view of a refrigerator with a door switch according to prior arts.
Figure 2:
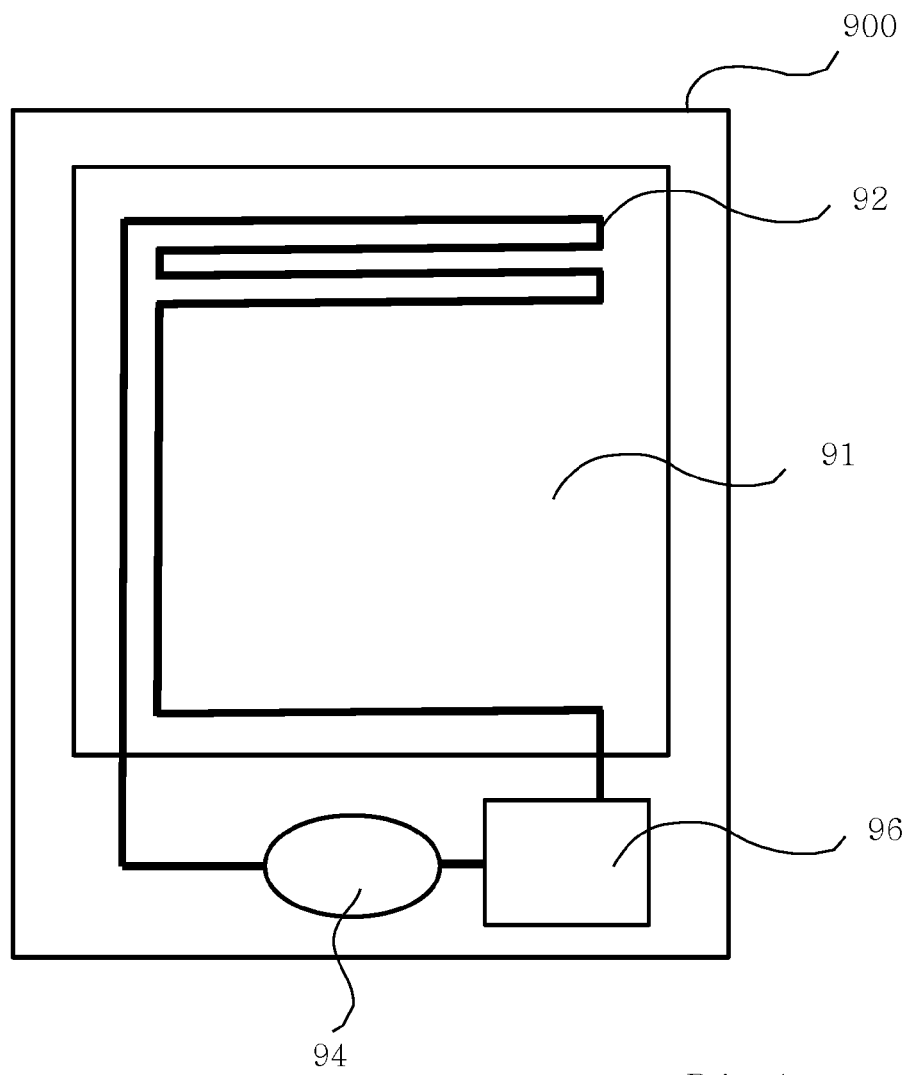
FIG. 2 is a schematic diagram showing a conventional refrigerator.

The refrigerator 900 includes a storage space 91 that is cooled by refrigerant flowing through an evaporator 92, a compressor 94, and a condenser 96 as shown in FIGS. 2 and 3.

An aspect of the invention provides a door switch system 100 for energy saving in a refrigerator 900. The refrigerator 900 includes a storage space 91 that is cooled by refrigerant flowing through an evaporator 92, a storage-space light 93, a compressor 94, a condenser 96, and a cooling fan 95.

The door switch system 100 comprises a light detector 10, a first switch 20, and a second switch 30.

The light detector 10 is disposed in the storage space 91 of the refrigerator 900. Only one of the light detector 10 may be enough at an appropriate location, but more that one may be provided as shown in FIGS. 3 and 4.

The first switch 20 is configured for switching the cooling fan 95 according to an output from the light detector 10 detecting external light.

The second switch 30 is configured for switching the storage-space light 93 according to an output from the light detector detecting external light.

When a door 97 to the storage space 91 is opened and the output is a first output indicating an open state of the door 97, the first switch 20 is off to stop the cooling fan 95 and the second switch 30 is on to turn on the storage-space light 93, so that the user can see inside with light but the cooled air can be saved more by stopping the cooling fan 95.

The light detector 10 may be configured to detect the external light from an external light source 990 outside the storage space 91 and provide the first output to the first and second switches 20, 30 when the external light is detected, that is, when the door 97 is opened.

The light detector 10 may be installed inside the storage space 91 as three of them as shown in FIG. 4.

The light detector 10 may be installed at an inner portion of the storage space 91 away from the door 97 to the storage space 91 as the one in the leftmost as shown in FIG. 4.

Alternatively, the light detector 10 may be installed close to the door 97 to the storage space 91 as the one closest to the door 97 as shown in FIG. 4.

The light detector 10 may be configured to provide a second output indicating a close state of the door 97 when the door 97 is closed.

The light detector 10 may be configured to provide the second output in a specific time period after the first output was provided. Thus, in a case that the second output is not provided for a specific time period for some unknown reason, the light detector 10 may fire up the second output to return the operation back to the original state: the cooling fan 95 is on and the storage-space light 93 is off.

When the second output is provided, the first switch 20 may be on to start the cooling fan 95 and the second switch 30 is off to turn off the storage-space light 93.

The door switch system 100 may further comprise an external reference light 40 provided at a specifically-controlled location outside the storage space 91 to illuminate the light detector 10 when the door 97 is opened as shown in FIG. 4. It may be configured that the light (L) can reach the light detector 10 as soon as the door 97 is opened.

The external reference light 40 may comprise a security light or a night light 40'. Such security light or a night light 40' may be actually an ambient light, which can be compared and detected with respect to a pitch-black darkness in the closed storage space 91.

The external reference light 40 may be installed to be directed to the light detector 10 as the one located on a lower portion of FIG. 4. Such external reference light 40 may be disposed in a secluded location off from an eyesight of the user.

The first switch 20 and the second switch 30 may be integrated into one switch. Even though they are provided separately in FIG. 3, the first and second switches 20, 30 can be provided by one switch. Using a single output from the combined switch, the cooling fan 95 and the storage-space light 93 may be configured electronically to be operated properly.

In FIG. 4, the first and second switches 20, 30 are omitted just for convenience in order to highlight the operation of the light detectors 10. The door 97 is opened, and therefore is not shown.

While the invention has been shown and described with reference to different embodiments thereof, it will be appreciated by those skilled in the art that variations in form, detail, compositions and operation may be made without departing from the spirit and scope of the invention as defined by the accompanying claims.

What is claimed is:

1. A door switch system for energy saving in a refrigerator, wherein the refrigerator includes a storage space that is cooled by refrigerant flowing through an evaporator, a storage-space light, a compressor, a condenser, and a cooling fan, the door switch system comprising:
   a light detector disposed in the storage space;
   a first switch configured for switching the cooling fan according to an output from the light detector detecting external light; and
   a second switch configured for switching the storage-space light according to an output from the light detector detecting external light,
   wherein when a door to the storage space is opened and the output is a first output indicating an open state of the door, the first switch is off to stop the cooling fan and the second switch is on to turn on the storage-space light.

2. The door switch system of claim 1, wherein the light detector is configured to detect the external light outside the storage space and provide the first output to the first and second switches.

3. The door switch system of claim 2, wherein the light detector is installed inside the storage space.

4. The door switch system of claim 2, wherein the light detector is installed at an inner portion of the storage space away from the door to the storage space.

5. The door switch system of claim 2, wherein the light detector is installed close to the door to the storage space.

6. The door switch system of claim 1, wherein the light detector is configured to provide a second output indicating a close state of the door when the door is closed.

7. The door switch system of claim 6, wherein the light detector is configured to provide the second output in a specific time period after the first output was provided.

8. The door switch system of claim 6, wherein when the second output is provided, the first switch is on to start the cooling fan and the second switch is off to turn off the storage-space light.

9. The door switch system of claim 1, further comprising an external reference light provided outside the storage space to illuminate the light detector when the door is opened.

10. The door switch system of claim 9, wherein the external reference light comprises a security light or a night light.

11. The door switch system of claim 10, wherein the external reference light is installed to be directed to the light detector.

12. The door switch system of claim 1, wherein the first switch and the second switch are integrated into one switch.

\* \* \* \* \*